United States Patent
Olsen et al.

(10) Patent No.: US 10,459,064 B2
(45) Date of Patent: Oct. 29, 2019

(54) LOCATION SYSTEM

(71) Applicant: Sonitor Technologies AS, Oslo (NO)

(72) Inventors: Oystein Olsen, Asker (NO); Wilfred Booij, Nordby (NO)

(73) Assignee: Sonitor Technologies AS, Oslo (NO)

( * ) Notice: Subject to any disclaimer, the term of this patent is extended or adjusted under 35 U.S.C. 154(b) by 58 days.

(21) Appl. No.: 15/570,018

(22) PCT Filed: Apr. 21, 2016

(86) PCT No.: PCT/GB2016/051113
§ 371 (c)(1),
(2) Date: Oct. 27, 2017

(87) PCT Pub. No.: WO2016/174396
PCT Pub. Date: Nov. 3, 2016

(65) Prior Publication Data
US 2018/0164398 A1 Jun. 14, 2018

(30) Foreign Application Priority Data
Apr. 28, 2015 (GB) .................................. 1507208.5

(51) Int. Cl.
*G01S 5/02* (2010.01)
*G01S 5/00* (2006.01)
*G01S 5/30* (2006.01)

(52) U.S. Cl.
CPC ............ *G01S 5/021* (2013.01); *G01S 5/0036* (2013.01); *G01S 5/30* (2013.01)

(58) Field of Classification Search
CPC .......... G01S 5/021; G01S 19/24; G01S 19/29; G01S 19/37; G01S 5/14; G01S 11/08;
(Continued)

(56) References Cited

U.S. PATENT DOCUMENTS 6,958,677 B1 10/2005 Carter
8,604,909 B1 12/2013 Amir et al.
(Continued)

FOREIGN PATENT DOCUMENTS

WO WO03093867 A1 11/2003
WO WO2004051303 A1 6/2004
(Continued)

OTHER PUBLICATIONS

Sundararaman et al. "Clock Synchronization for Wireless Sensor Networks: A Survey", Ad Hoc Networks, vol. 3, issue 3, Mar. 22, 2005.
(Continued)

*Primary Examiner* — George Eng
*Assistant Examiner* — Jing Gao
(74) *Attorney, Agent, or Firm* — O'Shea Getz P.C.

(57) ABSTRACT

A system for determining the location of a mobile receiver unit includes static transmitter units, each including a respective clock which it uses to transmit a positioning signal according to a respective transmission schedule. The mobile receiver unit receives a positioning signal from any of the static transmitter units. A first processing means uses information relating to the received positioning signal to determine the location of the mobile receiver unit. A second processing means uses information relating to a respective drift and/or offset of each of the clocks of the static transmitter units to generate transmission schedules for the static transmitter units. Each transmission schedule instructs a respective static transmitter unit to transmit a positioning signal at one or more scheduled times according to the clock of the static transmitter unit.

27 Claims, 2 Drawing Sheets

(58) Field of Classification Search
CPC .......... G01S 19/05; G01S 5/0036; G01S 5/30;
G01S 19/14; G01S 5/0009; G01S 19/42;
G01S 19/52; G01S 11/10; G01S 19/02;
G01S 19/03; G01S 19/10; G01S 19/13;
G01S 19/18; G01S 19/22; G01S 19/32;
G01S 19/39; G01S 19/40; G01S 19/41;
G01S 19/43; G01S 19/48; G01S 19/49;
G01S 19/50; G01S 1/50; G01S 2013/466;
G01S 5/06; G01S 13/825; G01S 19/07;
G01S 19/09; G01S 19/23; G01S 19/235;
G01S 19/258; G01S 5/0063; G01S
5/0072; G01S 5/009; G01S 5/02; G01S
5/0242; G01S 5/0263; G01S 5/145;
H04W 64/00; H04W 56/00; H04W
56/0035; H04W 4/80; H04W 52/029
See application file for complete search history.

(56) References Cited

U.S. PATENT DOCUMENTS

2014/0028632 A1\* 1/2014 Thielemann .......... G06F 3/0416
345/177
2015/0160330 A1 6/2015 Booij et al.

FOREIGN PATENT DOCUMENTS

| WO | WO2010084308 | A2 | 7/2010 | | |
|----|--------------|-----|--------|---|---|
| WO | WO2012137017 | A2 | 10/2012 | | |
| WO | WO-2013008169 | A1 * | 1/2013 | .............. | G01S 1/80 |
| WO | WO2013008169 | A1 | 1/2013 | | |
| WO | WO2014020348 | A1 | 2/2014 | | |

OTHER PUBLICATIONS

Brzozowski et al. "On Efficient Clock Drift Prediction Means and Their Applicability to IEEE 802.15.4", 8th International Conference on Embedded and Ubiquitous Computer (EUC), Dec. 11-13, 2010.

Cox et al. "Time Synchronization for ZigBee Networks", Proceedings of the Thirty-Seventh Southeastern Symposium on System Theory, 2005, pp. 135-138.

Van Greunen et al. "Lightweight Time Synchronization for Sensor Networks", WSNA '03 Proceedings of the 2nd ACM Internationa Conference on Wireless Sensor Networks and Applications, Sep. 19, 2003, pp. 11-19.

Marco et al. "Location-Based Services for Elderly and Disabled People", Computer Communications 31 (2008) pp. 1055-1066.

Alvaro Marco Marco "Zigbee-and Ultrasound-Based Multimodal Indoor Multicell Location System", University of Zaragoza, Oct. 2008.

Romer et al. "Time Synchronization and Calibration in Wireless Sensor Networks", Sep. 23, 2005, www.vs.inf.ethz.ch/publ/papers/wsn-time-book.pdf.

Jeremy Elson, "Time Synchronization in Wireless Sensor Networks", University of California, Los Angeles, 2003.

\* cited by examiner

LOCATION SYSTEM

This application claims priority to PCT Patent Appln. No. PCT/GB20161051113 filed Apr. 21, 2016, which claims priority to GB Patent Appln. No. 1507208.5 filed Apr. 28, 2015, which are herein incorporated by reference.

BACKGROUND OF THE INVENTION

1. Technical Field

This invention relates to methods and apparatus for determining the location of a mobile unit.

2. Background Information

There are many situations in which it is desirable to be able to discover the location of a moveable object, such as a person or an item of equipment, within an area such as a hospital.

It is known to provide a network of static base stations, e.g. attached to ceilings or walls, and to attach tags or similar devices to moveable objects, where positioning signals, such as radio, ultrasound or infrared signals, are sent between the base stations and the tags to enable the location of the tagged object to be determined. Such a system may, for instance, be used to determine which room of a building the object is in. Ultrasound is well suited to this purpose as it is undetectable by humans. It also travels much more slowly through air than radio waves do, and attenuates more rapidly, especially in the presence of structural building members such as walls, ceilings and floors. This can facilitate proximity detection using time of flight (TOF) information and/or received signal strength (RSS) information.

A positioning system may reduce its power consumption by activating its receivers only around the time the positioning signals are being transmitted. This is particularly beneficial when the receivers are battery-powered. Further power savings are possible if some or all of the transmitters are synchronised to transmit at approximately the same time as each other, since this allows a receiver to sleep for longer without reducing the update rate of the positioning system.

WO 20041051303, by the present applicant, describes a system for determining the position of mobile identification tags that are equipped with ultrasonic receivers and radio transmitters. Each room of a building is fitted with a stationary master unit as well as optional stationary slave units. When a user wants to locate a tag, the user initiates a position update process from a server. For each room in turn, the server causes the stationary units in the room to simultaneously transmit coded ultrasonic pulses. These coded pulses are received by any identification tags in the room. Each of these identification tags calculates the arrival times of the ultrasonic pulses it receives, and transmits this information, together with the tag's ID code, to the server by radio. The server can then update a database with the positions of the identification tags. The simultaneous transmission of ultrasound pulses by the stationary units in a room may be accomplished by a synchronisation message being sent from the server to a master unit, which in turn sends synchronisation messages to its connected slave units. These synchronisation messages may be sent by radio. The identification tags may be equipped with radio receivers which they use to intercept the radio waves transmitted from the server to a master unit, and may switch on their ultrasonic receivers for a certain period after intercepting the radio waves.

Such a system has certain shortcomings. In particular, each position update involves a large amount of radio communication overhead, which must be reliably transmitted and received in order for the positioning process to be successful. Each position update may also take a very long time when there are a large number of rooms to interrogate, since each room is interrogated in turn.

SUMMARY OF THE INVENTION

The present invention takes a different approach.

From a first aspect, the invention provides a system for determining the location of a mobile receiver unit, the system comprising: a plurality of static transmitter units, each comprising a respective clock and being configured to use the respective clock to transmit a positioning signal according to a respective transmission schedule; a mobile receiver unit configured to receive a positioning signal from any of the static transmitter units; first processing means configured to use information relating to the received positioning signal to determine the location of the mobile receiver unit; and second processing means configured to use information relating to a respective drift and/or offset of each of the clocks of the static transmitter units to generate transmission schedules for the static transmitter units, each transmission schedule instructing a respective static transmitter unit to transmit a positioning signal at one or more scheduled times according to the clock of the static transmitter unit.

From a second aspect, the invention provides a method of determining the location of a mobile receiver unit using a plurality of static transmitter units, each comprising a respective clock, the method comprising: using information relating to a respective drift and/or offset of each of the clocks of the static transmitter units to generate transmission schedules for the static transmitter units, each transmission schedule instructing a respective static transmitter unit to transmit a positioning signal at one or more scheduled times according to the clock of the static transmitter unit; each of the static transmitters units using its clock to transmit a respective positioning signal according to a respective transmission schedule for the static transmitter unit; receiving one of the positioning signals at the mobile receiver unit; and using information relating to the received positioning signal to determine the location of the mobile receiver unit.

Thus it will be seen by those skilled in the art that, in accordance with the invention, the system effectively uses a model of the local clock of each static transmitter unit to generate individualised transmission schedules for the transmitter units. The transmission schedules take account of the expected drift and/or offset of each transmitter unit's clock, thereby enabling the plurality of static transmitter units to transmit positioning signals at predetermined, coordinated times.

In some embodiments, the static transmitter units may be instructed to transmit positioning signals in different respective time slots. The positioning signals may be transmitted in respective transmission windows that have no mutual overlap. This can prevent unhelpful interference, thereby improving reliability and accuracy. The time slots may all be distinct, or some of the time slots may be the same as other time slots or may partially overlap one another. In some embodiments, time slots may be unique within a radius of each static transmitter unit (e.g., within 50 meters), or they may be unique across the whole system.

In other embodiments, however, at least some of the static transmitter units may be instructed to transmit their positioning signals at least partially overlapping each other, such as at substantially the same time as each other (e.g., with the transmissions of the positioning signals from multiple transmitter units starting at substantially the same time as each other).

Unlike in the prior-art described above, such an approach does not require a server to communicate a radio synchronisation message to each transmitter unit every time a positioning update is required. It is therefore a more robust and reliable system. It is also more easily scalable across large installations (e.g., across a large hospital complex), because it does not require a server to transmit synchronisation messages at ever-higher radio transmission powers as the installation grows, in order to synchronise all of the static units. Instead, if the transmission schedules are generated remotely from the static transmitter units, they may be sent to the transmitter units using any suitable wired or wireless links. They need not necessarily be transported instantaneously across these links.

The first and second processing means may comprise any appropriate hardware and/or software. The first processing means may be a first processing subsystem. The second processing means may be a second processing subsystem. In some embodiments, they may comprise the same hardware; e.g., they may both be implemented on the same server. The mobile receiver unit and/or one or more of the static transmitter units may comprise some or all of the first processing means. For instance, the mobile receiver unit may be able to determine its own location, which it might then output to a user, e.g., on a display of the mobile receiver unit. However, more preferably, the first processing means are partially or wholly distinct and/or partially or wholly remote from the mobile receiver unit and the static transmitter units; e.g., on a first server. The mobile receiver unit is preferably configured to communicate information relating to a received positioning signal to the first processing means over one or more wired or wireless links (e.g., by radio). The mobile receiver unit and/or one or more of the static transmitter units may comprise some or all of the second processing means. However, preferably, the second processing means are partially or wholly distinct and/or partially or wholly remote from the mobile receiver unit and the static transmitter units; e.g., on a second server (which may be the same as the previously-mentioned first server, or which may be different).

In some embodiments, the transmission schedules are such that the static transmitter units transmit positioning signals at substantially the same time as each other, or in a common time window. This provides low latency and allows the power consumption in the mobile receiver units to be reduced, compared with a time-slotted approach. The positioning signals, and any other features of the system, may be as described previously in WO 2012/137017 or WO 2014/020348 by the present applicant, the entire contents of which are hereby incorporated by reference.

The second processing means preferably uses information relating to both the drift and the offset of each of the clocks of the static transmitter units to generate transmission schedules for the static transmitter units. However, this is not essential, and usable synchronisation may be possible using just offset information, if the information is updated sufficiently frequently. If all the clocks are known to have had one or more particular values at a moment in time, then just drift information may be sufficient to synchronise the system. In general, the drift of a clock indicates how much faster or slower that clock measures time compared with a reference clock, while the offset of a clock represents the numerical difference between that clock and a reference clock at a particular point in time.

The information relating to a respective drift and/or offset of each of the clocks of the static transmitter units may be stored in one or more memories. It may be stored in a database or a table or any other suitable format. It may be stored in a synchronisation data store, which may be centralised or distributed. The information may relate to any number of static transmitter units; e.g., two, more than two, three, more than three, five or more, ten or more, etc. (There may, of course, be other static transmitter units for which information relating to a respective drift and/or offset of their clocks is not stored or is not used by the second processing means; e.g., because such information is not available.)

In some embodiments, the drift and/or offset information of all of the static transmitter units, as it is stored and/or used, may be determined relative to a reference clock, such as a clock on a server or on a reference one of the static transmitter units. However, it may be stored relative to a clock of another device in the system, such as a radio gateway device (as described in more detail below). It may be stored as relative offsets and/or or drifts between pairs of devices in the system, such as between a static transmitter unit and a radio gateway device. Given enough such pairs, it may be possible to calculate the relative offsets and/or drifts between any two devices from such information, by mathematically composing the offsets or drifts in a chain of pairs forming a path between the two devices. In some embodiments, information relating to relative offsets and/or drifts between pairs of devices in the system is determined by the system and is used to derive offset and/or drift information for each static transmitter unit relative to a common reference clock. This derivation may be done ahead of time, or whenever a new transmission schedule is generated for a particular static transmitter unit. It will be appreciated that the drift and/or offset information may be stored in any suitable format or mathematical representation, and at any appropriate level of precision or accuracy. How the information may be obtained is described in more detail below.

The system may comprise a synchronisation data store, storing information relating to the drift and/or offset of each of the clocks of the static transmitter units. The second processing means may comprise the synchronisation data store, or the second processing means may be arranged to access the synchronisation data store (e.g., over a network connection).

The transmission schedules could be generated by the static transmitter units themselves, based on information relating to the drift and/or offset of their clocks, which they may receive or access from the server or from a separate synchronisation data store. In this case the static transmitter units may form part of the second processing means. Preferably, however, a server is configured to generate the transmission schedules for the static transmitter units. The server may send the transmission schedules to the static transmitter units (e.g., by radio or over an Ethernet connection). The transmission schedules for the static transmitter units may be generated from a master transmission schedule, which may be defined according to a reference clock. The master transmission schedule may specify different scheduled times for different static transmitter units (e.g., in a time-slotted system), or it may specify one set of schedule times to be used by all of the static transmitter units (e.g., in a simultaneous-transmission system).

From a further aspect, the invention provides a server for use in a system for determining the location of a mobile receiver unit, the system comprising a plurality of static transmitter units, each comprising a respective clock and being configured to use the respective clock to transmit a positioning signal according to a respective transmission schedule, wherein the server is configured to: use information relating a respective drift and/or offset of each of the clocks of the static transmitter units to generate transmission schedules for the static transmitter units, each transmission schedule instructing a respective static transmitter unit to transmit a positioning signal at one or more scheduled times according to the clock of the static transmitter unit; and receive information, from the mobile receiver unit, relating to a positioning signal received by the mobile receiver unit from one of the static transmitter units, and to use the information to determine the location of the mobile receiver unit.

In any of the embodiments described herein, a server may be a single physical device, or it may comprise multiple devices, such as two or more physically-distinct computers or processors, which may be connected to each other by a data network. The functions of the first and second processing means may be shared between multiple devices or processing units in any appropriate way.

The positioning signals may take any suitable form. In some embodiments the positioning signals may comprise audible signals, infrared signals, radio signals, or any other acoustic signals or electromagnetic signals. There may be others types of positioning signal used within the same system (e.g., a mixture of ultrasound positioning signals and radio positioning signals). One static transmitter unit may potentially be configured to transmit more than one type of positioning signal, or different static transmitter units may transmit different respective types of positioning signal. The transmission schedules may be such that one type of positioning signal (e.g., ultrasound signals) are transmitted simultaneously by multiple static transmitter units, while another type of positioning signal (e.g., radio-frequency signals) are transmitted in respective time slots. This may be advantageous where the mobile receiver unit is relatively good at discriminating between overlapping signals of one type (e.g., ultrasound), but relatively poor at discriminating between overlapping signals of another type (e.g., RF).

For example, in some embodiments, at least some of the static transmitter units may comprise near-field communication transmitters. In some embodiments, the positioning signals may comprise low-frequency radio signals. These low-frequency radio signals may have an effective range of a few meters (e.g. about 10 meters or less). One or more of the static transmitter units may be located at natural chokepoints, such as doorways, whereby the mobile receiver unit would have to come into close proximity to the static transmitter unit if it is passing by. Such an approach is not limited to low-frequency radio signals, but could also be used with higher-frequency radio signals (e.g., low-power 2.4 GHz beacons).

In a preferred set of embodiments, the positioning signals comprise ultrasonic signals. The plurality of static transmitter units therefore preferably comprise respective ultrasound transmitters. The mobile receiver unit preferably comprises an ultrasound receiver. Ultrasonic signals can be beneficial as they travel relatively slowly and so can be processed relatively straightforwardly. They are also attenuated by structural members of buildings, which can help with position determination, and are not intrusive to human beings.

The positioning signals are preferable discrete signals. They are preferably transmitted at intervals, which are preferably regular. The static transmitter units may all transmit at the same intervals. Each static transmitter unit may, for example, transmit a positioning signal every one second. The static transmitter units may transmit at substantially the same time as each other.

The positioning signals may comprise pulses, chirps, messages, or any other suitable signals. At least some of the positioning signals may encode an identifier associated with the static transmitter unit that transmitted the positioning signal. This location identifier may be an arbitrary value associated with the static transmitter unit (e.g., a serial number), or it may represent the physical location of the static transmitter unit (e.g., the name of a room containing the transmitter unit, or a grid reference). Such encoding may involve the frequency information and/or phase information and/or amplitude information of the positioning signal. In some embodiments, a location identifier is frequency-shift-key (FSK)-encoded and/or direct-sequence spread-spectrum (DSSS)-encoded in the positioning signal. The positioning signals may encode other information, such information relating to the time of transmission of the positioning signals, or an intended recipient. Successive positioning signals transmitted by a particular static transmitter unit may be the same as each other, or they may differ. For example, a transmitter unit may sometimes transmit a positioning signal that encodes the identity of the transmitter unit, and may sometimes transmit a positioning signal that contains a pattern suitable for very accurate time-of-arrival determination (e.g., as described in WO 2012/137017). These two types of positioning signal could be alternated, or one may be transmitted every nth transmission (e.g. every third, tenth or hundredth transmission), with the other being transmitted between times.

The positioning signals from different static transmitter units may all be the same length as each other, or they may be of differing lengths. In embodiments in which the positioning signals are transmitted in a common time window, this common time window may be the same length as the positioning signals (if they are all the same length), or the same length as a longest one of the positioning signals (if they are of different lengths), or some multiple of these (e.g., 1.5 or 2 times this length). In some embodiments, the transmission schedules may be such that all of the plurality of static transmitter units transmit positioning signals at substantially the same time as each other. Positioning signals may be transmitted at substantially the same time as each other by the beginnings of the positioning signals being transmitted simultaneously, or by there being some moment in time at which all of the static transmitter units are transmitting positioning signals simultaneously. It will be understood that, in practice, the stored drift and/or offset information may not always be accurate (e.g., if a clock in a static transmitter unit experiences a rapid temperature change which causes it to speed up or slow down), and so, while the transmission schedules may instruct the plurality of static transmitter units to transmit positioning signals at the same time as each other, in reality, some transmissions may not always overlap in time, especially if the positioning signals are of short duration.

One or more of the plurality of static transmitter units may, of course, transmit additional positioning signals at different times from the other static transmitter units.

The system may be deployed across one or more buildings and/or outdoor areas. The static transmitter units may be installed in different rooms of a building. Multiple static transmitter units may be installed in the same room as each other. The static transmitter units may be powered by an external power source batteries, but preferably are battery-powered, as this can make installation easier and more flexible. They may be connected to a data network by a wired link, but are preferably arranged to communicate using one or more wireless data links. They may have both wired and wireless network connections; a wireless data link is beneficial to ensure accurate synchronisation, as described in more detail below. It will be appreciated that, while the static transmitter units are generally intended to be static, they may occasionally be moved (e.g., during installation or routine maintenance); however, they are preferably such that their positions have been programmed into the system (e.g. as points on a map) and/or are designed such that they are intended to remain in one place for extended periods of time. They may be fixed in place—e.g., fastened to one or more structural members, such as a wall, ceiling, floor or mast. For the avoidance of doubt, it is important to note that the internal state of the static transmitter units is not necessarily static (e.g., their software or hardware may be arranged to be dynamically reconfigured by radio or other means).

The static transmitter units preferably comprise crystal oscillators (e.g., 32 kHz crystal oscillators), to provide a stable time reference. They preferably comprise clocks (timers) based on these crystal oscillators. The clocks in the static transmitter units may be set to measure time from a common offset, e.g. Unix time, but they preferably have arbitrary offsets. Each clock may be reset upon a device reset of the static transmitter unit. In some embodiments, the clocks are 24-bit timers, which may wrap around every few minutes.

Each static transmitter unit may store a respective transmission schedule, e.g. in a volatile or nonvolatile memory of the static transmitter unit. A transmission schedule may take any suitable form. It may comprise a set of one or more clock values at which the static transmitter unit should transmit a positioning signal. It may comprise an algorithm or equation that determines a set of one or more clock values at which the static transmitter unit should transmit a positioning signal, or it may comprise one or more values that determines a set of one or more clock values at which the static transmitter unit should transmit a positioning signal (e.g. as one or more parameters for a predetermined algorithm or equation). Each transmission schedule preferably instructs a static transmitter unit to transmit positioning signals at a plurality of scheduled times, according to the clock of the static transmitter unit. A transmission schedule may convey an infinite set of scheduled times.

In some embodiments, each transmission schedule communicates a clock counter value and a period to a static transmitter unit (to be measured by the local static transmitter unit clock). These values may be encoded in any appropriate way. The clock counter value may define the transmission time of the next positioning signal, and the period may define a finite or infinite series of subsequent positioning signals, at intervals equal to the period. The clock counter value and/or the period may have a fractional representation, to improve on the native clock tick resolution (e.g., 32 kHz resolution).

After sending a positioning signal at the instructed clock counter value, a static transmitter unit may add the period to the clock counter value and wait for a clock alarm on the integer part, keeping the fractional part to be accumulated for a later positioning signal. In this way, it has been found to be possible for a static transmitter unit to run autonomously on an instructed transmission schedule for several hours while remain coordinated with the other static transmitter units to within a one-millisecond error.

The mobile receiver unit may be configured to decode information from a received positioning signal, such as an identity of a static transmitter unit that transmitted the positioning signal. It may communicate this identity, or any other relevant information, to the first processing means. The mobile receiver unit may be configured to determine a time of arrival of the positioning signal at the mobile receiver unit. It may communicate information relating to the time of arrival to the first processing means, such as a time-of-arrival timestamp according to a clock of the mobile receiver unit. In some embodiments, the mobile receiver unit may be configured to determine a time of transmission of a received positioning signal, e.g. by determining the time of arrival of a speed-of-light communication transmitted simultaneously with the positioning signal. The mobile receiver unit may thereby determine a time of flight for the positioning signal. It may communicate the time of flight, or information relating thereto, to the first processing means.

The mobile receiver unit may send information to the first processing means using any appropriate communication channel; in some embodiments, it may send information by radio (e.g., by an 802.11 multicast, or by a ZigBee message). In some embodiments, the system comprises one or more 802.11 base stations, connected to the first processing means by a network (e.g., an Ethernet network). The mobile receiver unit preferably implements some or all of the Cisco™ Compatible Extensions for Wi-Fi Tags. The mobile receiver unit preferably sends an identifier associated with itself when sending information to the first processing means.

In some embodiments, the mobile receiver unit is configured to determine whether a newly-received location identifier differs from a previously-received location identifier (preferably, the most-recently-received earlier location identifier), and, if so, to send information relating to the newly-received location identifier to the first processing means. The mobile receiver unit may be configured not to transmit such information to the first processing means if the identifiers have not changed.

The identifier associated with a static transmitter unit may comprise a first portion (e.g., a five-bit zone ID) and a second portion (e.g., a five-bit area ID). The identifiers are preferably allocated to the static transmitter units such that groups of adjacent static transmitter units have the same respective second portions. The mobile receiver unit may then be configured to decode the first portion first, and to decode the second portion only if the first portion differs from the most-recently-decoded previous first portion. This allows the mobile receiver unit to save power by not decoding the second portion when it is unlikely to have changed, due to the way the identifiers are distributed spatially.

The mobile receiver unit preferably comprises a timer, which may be relatively low accuracy (e.g., around two parts per thousand). The mobile receiver unit is preferably arranged to deactivate its positioning-signal receiver after receiving a positioning signal, and to use the timer to reactivate the positioning-signal receiver for when a next positioning signal is expected, based on the arrival time of the latest positioning signal. The mobile receiver unit may reactivate the receiver a predetermined time (e.g. 10 milliseconds) before the expected arrival of a next positioning signal. This allows for some inaccuracy in the timer, and for possible movement of the mobile receiver unit closer to a static transmitter unit.

The mobile receiver unit preferably comprises a motion detector for detecting when the mobile receiver unit is in motion. The mobile receiver unit is then preferably configured to listen for positioning signals at intervals—preferably at regular intervals (e.g., every one second)—while the mobile receiver unit is in motion. While the mobile receiver unit is not in motion, it is preferably configured to enter a sleep state during which it listens for positioning signals at substantially longer intervals—preferably regular intervals—which may be at least 10 or 100 times as long as the non-sleep intervals (e.g., 10-minute intervals).

The mobile receiver unit may comprise fastening means for attaching the mobile receiver unit to an object, such as a person or an item of equipment. The mobile receiver unit is preferably battery-powered. It will be appreciated that the mobile receiver unit will not necessarily always be in motion; however, it is preferably mobile in that it is designed to be portable.

The first processing means may receive information, from a mobile receiver unit, that identifies a static transmitter unit whose positioning signal the mobile receiver unit received; the first processing means may use this information to determine the location of the mobile receiver unit. For instance, the positioning signal may determine that the mobile receiver unit is in the same room as a particular static transmitter unit (e.g., proximity detection). The mobile receiver unit and/or the first processing means may use information relating to the strength of the received positioning signal when determining the location of the mobile receiver unit (e.g., if the mobile receiver unit detects two or more positioning signals at the same time, it may report the identity of the static transmitter unit Whose positioning signal is received by the mobile receiver unit with the strongest received signal strength). The first processing means may store a location estimate for the mobile receiver unit in a memory, such as a database.

The first processing means may store, or have access to, data relating to the locations of the static transmitter units and/or a plan or map of a site, such as the position of attenuating members such as walls and ceilings. The first processing means may be arranged to output data for display to a user, e.g. on a display screen, indicating a location, or set of possible locations, for the mobile receiver unit.

The system may comprise a plurality of mobile receiver units (e.g. two, three, five, ten, or more), all configured to receive positioning signals from the static transmitter units, and to communicate information relating to received positioning signals to the first processing means. The mobile receiver units may each have any or all of the features described above. The first processing means may use the information to determine locations of all of the mobile receiver units. It will be understood that such locations may be estimates, and may comprise a range of possible locations, such as an area or volume.

The system is preferably configured to determine locations of one or more mobile receiver units repeatedly at intervals, which may be regular intervals (e.g., every one second or so).

In some embodiments, the first processing means may be configured to use information relating to the transmission time and/or arrival time and/or time of flight of a positioning signal, between a static transmitter unit and a mobile receiver unit, when determining a location of the mobile receiver unit. The first processing means may use timing information relating to a plurality of positioning signals, transmitted by a plurality of static transmitter units, to determine a location of the mobile receiver unit. The first processing means may perform a multilateration calculation to determine a location of the mobile receiver unit. In some embodiments, the first processing means may use information relating to the angle of a positioning signal, between a static transmitter unit and a mobile receiver unit, when determining a location of the mobile receiver unit. The first processing means may use frequency or frequency-shift information, such as information relating to Doppler-shift, to determine information relating to movement of the mobile receiver unit. The first processing means may use information relating to movement of the mobile receiver unit when determining the location of the mobile receiver unit.

The second processing means may configured to send transmission schedules to the static transmitter units at intervals. If a static transmitter unit has a wired network connection, the transmission schedule may be received over the wired network connection. By sending updated transmission schedules, the synchronisation accuracy of the system can be improved. These may be sent at regular intervals; e.g., every five minutes. However, they need not necessarily be regular, and, in preferred embodiments, the second processing means are configured to send an updated transmission schedule to a static transmitter unit when the clock on the static transmitter unit is determined by the second processing means to have deviated from an expected time by more than a threshold level. In this way, the system may be highly synchronised but without excessive communication overhead. The threshold may be configurable by a user. The system may also be configured to send an updated transmission schedule to a static transmitter unit if more than a threshold time has elapsed since the previous updated transmission schedule was sent to that transmitter unit.

In some embodiments, the static transmitter units are configured with a transmission schedule timeout such that, if a static transmitter unit does not receive a transmission schedule update within the timeout, the static transmitter unit will stop transmitting positioning signals.

The system preferably comprises one or more radio gateways. Each gateway is preferably coupled to the second processing means by a network, which may be a wired network, such as Ethernet. The gateways may be internally-powered, but preferably receive electricity from an external source (e.g. power-over-Ethernet). Their radios are preferably permanently active. Each gateway is preferably capable of communicating with at least one of the static transmitter units by radio. Each static transmitter unit is preferably capable of communicating with at least one of the gateways by radio. The static transmitter units therefore preferably comprise radio transmitters (and preferably radio receivers also). This radio communication is preferably based on the IEEE 802.15.4 standard; it may implement the ZigBee protocol, or a similar proprietary protocol. It may use a predetermined address range in the 802.15.4 address space. It may use a particular 802.15.4 Personal Area Network identifier. Other radio protocols, such as Z-Wave, Wireless USB, WiMax, GSM, UMTS, CDMA2000, DECT, or WiFi, or variants or modifications thereof, could potentially be used instead.

The gateways are preferably arranged to relay messages between the static transmitter units and the second processing means. This relaying or forwarding of messages may, of course, comprise reformatting, simplifying, expanding, compressing, decompressing, recoding, or otherwise transforming the messages in any appropriate way.

Each gateway preferably comprises a clock. Each gateway may be configured to send a local timestamp to the second processing means when the gateway forwards a message received from a static transmitter units to the second processing means. (Of course, the gateways may also handle certain other messages, or types of message, differently; e.g., without sending associated timestamps.) The timestamp may be sent in a same communication as the forwarded message, or may be sent separately. This timestamp is preferably a reception timestamp, representing the time that the radio message was received by the gateway, according to the gateway clock. There is typically very little jitter in this process. A single radio message from a static transmitter unit may be received by a plurality of gateways, each of which then forwards the message, together with a respective local gateway reception timestamp. The gateways may also transmit received-signal-strength information (RSSI) for the message to the first processing means. The first second processing means may select one of the gateways to relay a response from the second processing means to the static transmitter unit. This selection may be based on the signal-strength information; e.g., selecting the gateway that reported the highest RSSI for the message.

The static transmitter units are preferably configured to transmit messages, by radio, at intervals—preferably at regular intervals (e.g. approximately every 60 seconds, or every 120 seconds). These transmitter-unit messages are preferably transmitted as broadcast messages, and may therefore be received by any one or more of the gateways. (Of course, the static transmitter units may also transmit other messages, or types of message, in addition to these transmitter unit messages.) Each gateway that receives such a transmitter-unit message preferably forwards the message to the second processing means (preferably with a gateway reception timestamp and/or RSSI information). These transmitter-unit messages are not restricted to any particular form or purpose. They may or may elicit a response from another device. In some embodiments, they comprise requests for any data that the second processing means may be waiting to send to the static transmitter unit. They may be addressed to the second processing means.

Each static transmitter unit preferably sends a transmission timestamp for some or all of the transmitter-unit messages, according to the clock of the static transmitter unit. The transmission timestamp is preferably included as a part of each transmitter-unit message, although it could be sent separately. The transmission timestamps are preferable sent to the second processing means (e.g., via one of the radio gateways).

Each of the transmitter-unit messages preferably also includes a value (referred to herein as the "Rx on" delay) representing a time interval at which the static transmitter unit will activate its radio receiver to listen for a reply message, after transmission of the transmitter-unit message. The "RX on" time delay may be around 100 milliseconds. It is preferably configurable. It is set so as to allow sufficient time for the gateway to forward the transmitter-unit message to the second processing means, for the second processing means to observe possible broadcast receptions from multiple gateways, and for the second processing means' reply to be relayed by the gateway. The transmitter-unit messages may also include information representing the time, according to the clock of the static transmitter unit, at which the static transmitter unit transmitted its most-recent positioning signal. This time value enables the second processing means to generate a revised transmission schedule for the static transmitter unit without having to keep a history of the last transmission schedule that it sent to that static transmitter unit. This "stateless" approach has been found to be advantageous as it avoids overloading the second processing means as the number of static transmitter units increases; it can also facilitate quick recovery from a hardware outage (e.g., if the second processing means is rebooted). The transmitter-unit messages may also include details of the latest transmission schedule received by the static transmitter unit.

The second processing means may be configured to reply to such a transmitter-unit message, received from a static transmitter unit. The reply preferably comprises any queued requests that the second processing means has for the static transmitter unit. Requests may be instructions that are sent during an initial configuration phase; thereafter, requests may comprise occasional polling for status information from the static transmitter unit (e.g., battery status). If there are no queued requests, the reply may comprise an acknowledgement message (e.g., a predetermined binary value); this is more power efficient than not replying at all, as it allows the static transmitter unit to turn off its radio receiver once it has received the acknowledgement message. When the second processing means determines that one or more criteria for sending an updated transmission schedule to the static transmitter unit have been met, the second processing means preferably includes an updated transmission schedule for the static transmitter unit in the reply.

The second processing means preferably instructs one of the gateways to transmit a reply to a transmitter-unit message at a particular time according to the clock of the gateway. The time is preferably based on the time at which the transmitter-unit message was transmitted by the static transmitter unit (which the second processing means can derive from the included transmission timestamp). The time is preferably this transmission time plus the "Rx on" delay communicated with the transmitter-unit message. The second processing means may also tell the selected gateway the radio address of the static transmitter unit when instructing the gateway to transmit the reply.

The second processing means preferably determines the drift and/or offset information for the clocks of the static transmitter units from timestamps sent by the transmitter units—preferably from the transmission timestamps included with the transmitter-unit messages.

In some less-preferred embodiments, these transmission timestamps may be received by the second processing means (e.g., being relayed on by the gateways). The second processing means may use information relating to the transmission delays between the static transmitter unit and the second processing means (e.g., estimates based on measured round-trip times) to estimate offsets between the clocks of the static transmitter units and the second processing means' clock. By monitoring these transmission timestamps or offsets over time, the second processing means may estimate the drift of each transmitter-unit clock—e.g., by applying a linear regression operation, or a moving average filter, to a series of timestamps or offsets.

Such an approach has, however, been found to be somewhat inaccurate in practice, due to the difficulty in accurately determining the transmission delays between the static transmitter unit and the second processing means. Preferably, therefore, the second processing means additionally uses reception timestamps from radio gateways to determine drift and/or offset information for the clocks of the static transmitter units.

The static transmitter units and gateways are preferably arranged so that, for each gateway, there is at least one static transmitter unit that is in radio communication range of that gateway and at least one other gateway. In this way, a radio message broadcast by such a static transmitter unit can be received by two or more gateways. A broadcast message may be addressed to a specific set of radio gateways, or it may be addressed to a general broadcast address, or it may contain no recipient address at all. The reception of a broadcast message by two or more gateways can be assumed, for practical purposes, to be simultaneous (and instantaneous with the transmission of the radio message). The second processing means preferably receives reception timestamps from all of the two or more gateways. The second processing means preferably uses these reception timestamps to determine a relative offset and/or drift between the clocks of the two or more gateways; this may be done in a pairwise fashion. The broadcast message may contain a transmission timestamp from the static transmitter unit, but this is not essential as it is possible to synchronise a pair of gateways without this. The second processing means preferably determines a relative offset for every pair of gateways that are in shared range of a transmitter unit. Preferably, the static transmitter units and gateways are arranged such that the gateways topologically form a single connected graph, with the gateway pairs being the edges of the graph.

The second processing means is preferably configured to select one of the gateways to be a reference gateway for the system. The clock of the selected gateway is then a reference clock for the system; i.e., the second processing means generates the transmission schedules so that the positioning signals are transmitted at predetermined time intervals as measured by the reference clock—for example, every 32,000 cycles of the reference clock.

The second processing means is preferably arranged to use a transmission timestamp from a static transmitter unit, and a corresponding reception timestamp from a gateway (which can be assumed to relate to the same moment in time), to determine a relative offset and/or drift between the clocks of the transmitter unit and the clock of the gateway. Relative offsets are preferably determined for all pairs of static transmitter units and gateways for which the second processing means has received appropriate transmission and/or reception timestamps.

The second processing means may be configured to filter received timestamps to remove any values that are not monotonically increasing. It is preferably arranged to correct for timer wrap-around.

The second processing means is preferably arranged to store information relating to a plurality of transmission and/or reception timestamps, or relative offsets, for each pair of devices—e.g., in a buffer. The second processing means preferably uses the stored information to determine a relative drift between the clocks of the pair of devices. It may do this by applying a linear regression operation to the information. When determining the relative drift, the second processing means may ignore timestamps that are closer in time to each other than a threshold minimum spacing. The second processing means may ignore information that relates to communications that occurred more than a threshold time in the past. The second processing means may ignore information that meets an outlier-removal criterion, such as timestamps that have a linear-regression residual that is more than a threshold number of times a median or mean residual. The second processing means may fail the drift determination process if the information does not meet one or more quality criteria, such as not having sufficient data or a sufficiently-good linear fit. The pair of devices may then be deemed "unlocked".

The second processing means may store in memory information identifying every pair of devices for which valid relative offset and drift information has been determined (referred to herein as the pair being "locked").

Given sufficient locked pairs, the second processing means can mathematically map time values between the clocks of any two devices (static transmitter units and gateways). In particular, the second processing means can convert between a reference gateway clock and the clock of every static transmitter unit. The second processing means preferably uses the offset and drift information to generate updated transmission schedules for the transmitter units.

To do this, the second processing means preferably determines information representing a device graph comprising the reference gateway and other gateways and transmitter units that are reachable under the lock relation. This device graph may include gateway-gateway edges and gateway-transmitter-unit edges. In some embodiments, at least some edges in the device graph may be weighted—e.g. based on a received signal strength indicator (RSSI) for a message between the two nodes. In preferred embodiments, received signal strength information is used to determine whether an edge between a gateway and a static transmitter unit is included in the device graph or not; e.g., with such edges being included only if a RSSI between the two devices exceeds a threshold.

For each static transmitter unit, the second processing means preferably determines a shortest path between the reference gateway and the static transmitter unit—e.g., using a breadth-first search of the device graph. The second processing means may then compose pairwise offset and/or drift information for all of the devices (nodes) along the shortest, in order to map a scheduled time from the reference clock to the clock of the static transmitter unit. This linear mapping may then be used to find a new transmission-schedule offset that maps the next positioning message, according to the reference gateway clock, to the transmitter-unit clock. The scale factor in the composed linear mapping may be used to set the period in the new transmission schedule. For example, the period under the reference clock may be 32,000 ticks, which the second processing means would map to an equivalent number of ticks of the particular transmitter-unit clock. These operations may be performed for a particular static transmitter unit in response to the second processing means' receiving a transmitter-unit message from the static transmitter unit, or they may be performed ahead of time.

If the second processing means determines that a selected reference gateway is no longer reachable by the second processing means, or can no longer be locked to other devices, the second processing means selects a new reference gateway. When generating transmission schedules using this new reference gateway, the second processing means attempts to preserve the same offset as was used with the previous reference gateway. The period, however, may be measured according to the new reference clock, which may be slightly faster or slower than the previous reference clock. Alternatively, the system may map the period under the previous reference clock to the new reference clock.

The system may, of course, comprise other static transmitter units and/or mobile receiver units which do not necessarily have all of the features described above. For instance, the system may comprise one or more static transmitter units that are not in communication with the second processing means and that operate on an independent transmission schedule. In other embodiments, the system may comprise two or more sets of static transmitter units, with the transmitter units of each set transmitting their positioning signals simultaneously with each other, but not simultaneously with the transmitter units of the other set or sets. This may occur where the system is deployed across multiple floors of a building, or across multiple buildings in a site, with each floor or building using a different positioning-signal transmission schedule.

The present system and its component parts may be controlled, monitored, etc. using any appropriate hardware and/or software. Any of the first processing means, second processing means, servers, gateways, static transmitter units, mobile receiver units, and synchronisation data store, or any combination thereof, may comprise one or more processors, microcontrollers, CPUs, DSPs, ASICs, volatile memories, non-volatile memories, analogue circuitry, digital circuitry, power supplies, receivers, transmitters, transducers, inputs, outputs, user interfaces, etc. as appropriate. Their functionality may be implemented using hardware, software, firmware, or a combination thereof. Any processor in a device of the system may include, or be in communication with, a memory operable to store software instructions, which memory may be non-volatile or may be in the form of non-transitory computer readable media in communication with the processor.

It will be appreciated that information referred to herein, such as timestamps, offsets, device graphs, etc., may be stored and/or processed in any appropriate manner, and the invention is not limited to any particular physical or mathematical representation of such information. References to a piece of information should be understood as encompassing any data representing that information in any suitable format or encoding, or derived from that information through any appropriate transformation or operation.

It will be appreciated that a transmission or reception timestamp may only approximately represent the actual start or finish of a transmission or reception event or window, e.g., because hardware or software delays, such as buffering, can introduce a degree of inaccuracy. More generally, any measurement referred to herein may only be an approximation.

Ultrasonic signals are acoustic signals having a frequency higher than the normal human hearing range; typically this means signals having a frequency greater than 20 kHz, e.g. between 30 and 100 kHz.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION OF THE INVENTION

Figure 1:
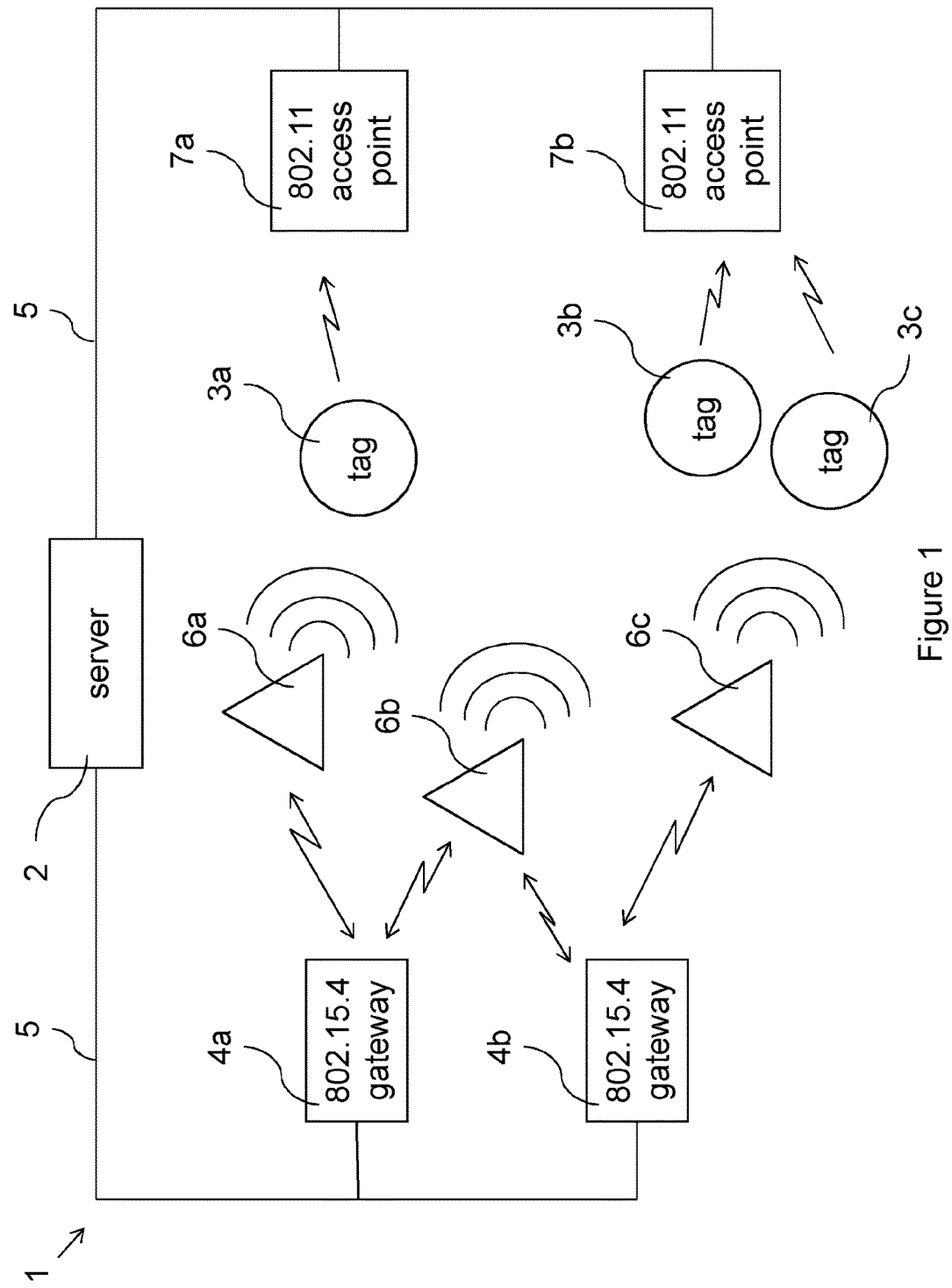
FIG. 1 is a schematic drawing of the main elements of a system embodying the invention.

FIG. 1 shows a real-time location system 1. It has a server 2 for tracking the locations of a number of mobile tags 3a, 3b, 3c (mobile receiver units) around a building, such as a hospital. The tags 3a, 3b, 3c will typically be attached to a person (e.g., by a lanyard around a person's neck, or as part of a wrist band), or to an item of movable equipment, such as a hospital bed. Details of an object associated with a tag may be stored on the server 2. The server 2 may also store a map of a site, such as floor plans of a hospital building, in which the tags 3a, 3b, 3c are present. It may output textual, graphical, or other data indicating the locations of the tags 3a, 3b, 3c, such a visual display of a floor plan with the estimated locations of one or more tags marked on the floor plan.

The server 2 is connected to a number of 802.15.4 gateways 4a, 4b by a wired Ethernet network 5. These gateways 4a, 4b contain two-way radios for communicating with static location transmitters 6a, 6b, 6c (static transmitter units) using a protocol built on the IEEE 802.15.4 standard.

The location transmitters 6a, 6b, 6c contain two-way radios for communicating with the gateways 4a, 4b. They also contain ultrasound transmitters for transmitting ultrasonic positioning signals that can be received by the tags 3a, 3b, 3c, They contain clocks and other circuitry for transmitting the ultrasonic positioning signals according to a transmission schedule, stored in a memory of the location transmitter.

The tags 3a, 3b, 3c contain ultrasonic receivers. They also contain radio transmitters for sending 802.11 multicast signals to IEEE 802.11 access points 7a, 7b. The tags 3a, 3b, 3c need not necessarily contain radio receivers, although this is not excluded. The tags 3a, 3b, 3c may implement some or all of the Cisco™ Compatible Extensions for Wi-Fi Tags.

The access points 7a, 7b are connected to the server 2 by the wired Ethernet network 5.

It will be appreciated that, in practice, a system may have many more tags, location transmitters, gateways and/or access points than are shown in FIG. 1.

The server 2, mobile tags 3a, 3b, 3c, gateways 4a, 4b, location transmitters 6a, 6b, 6c and access points 7a, 7b may each comprise one or more processors, microcontrollers, CPUs, DSPs, ASICs, volatile memories, non-volatile memories, analogue circuitry, digital circuitry, power supplies, receivers, transmitters, transducers, inputs, outputs, user interfaces, as appropriate. Some of their operation may be controlled by software.

The location transmitters 6a, 6b, 6c are preferably arranged so that all areas in which the tags 3a, 3b, 3c may commonly be found are within audible range of at least one of the location transmitters 6a, 6b, 6c, For instance, every room in a building may contain at least one location transmitter. In this way, it should be possible for the server 2 to determine which room each tag 3a, 3b, 3c is in. In some embodiments, it may be desired to know the location of the tags 3a, 3b, 3c more precisely, in which case location transmitters may be arranged so that the tags 3a, 3b, 3c will, in normal usage, be within audible range of three or more location transmitters. This can enable multilateration in two or three dimensions, for more accurate positioning.

In use, the server 2 sends transmission schedules to each location transmitter 6a, 6b, 6c at irregular intervals via the 802.15.4 gateways 4a, 4b. Each location transmitter 6a, 6b, 6c transmits ultrasound positioning signals at intervals, according to its respective transmission schedule. The transmission schedules are arranged so that the location transmitter 6a, 6b, 6c all transmit their positioning signals substantially simultaneously. Each positioning signal encodes the identity of the respective location transmitter 6a, 6b, 6c that transmitted it.

Transmission schedules for the location transmitters 6a, 6b, 6c are generated by the server 2 based on information, stored on the server 2, relating to the respective drift and offset of the clocks in the location transmitters 6a, 6b, 6c. The method by which the server 2 determines this drift and offset information is described in more detail below. An updated transmission schedule is sent to a location transmitter 6a, 6b, 6c whenever the server 2 determines, from a time-stamped communication by the location transmitter, that the location transmitter's clock has deviated from the time value that would be expected according to the stored drift and offset information by more than a threshold amount.

When a tag 3a, 3b, 3c receives an ultrasonic positioning signal from one of the location transmitter 6a, 6b, 6c, it decodes the signal to determine the identity of the location transmitter 6a, 6b, 6c that transmitted the signal. The tag 3a, 3b, 3c then transmits a multicast 802.11 message encoding the identity of the tag 3a, 3b, 3c and the identity of the location transmitter 6a, 6b, 6c. It may also transmit other information, such as the time of arrival of the positioning signal. The tags 3a, 3b, 3c may stagger their 802.11 transmissions to reduce the chance of collisions.

The 802.11 access points 7a, 7b listen for multicast messages from the tags 3a, 3b, 3c, and relay information from the received multicast messages to the server 2.

When the server 2 receives a message identifying a particular tag 3a, 3b, 3c and a particular location transmitter 6a, 6b, 6c, it uses this information to update a position estimate for the tag in a database on the server 2. In some embodiments, the server 2 may receive information from a tag 3a, 3b, 3c relating to the timing and/or Doppler-shift and/or angle-of-arrival of an ultrasound positioning signal, and it may use this information when determining the position of the tag 3a, 3b, 3c. If it receives such information in respect of multiple location transmitters 6a, 6b, 6c, for a single tag 3a, 3b, 3c, the server 2 may perform a triangulation or multilateration operation to determine or refine a position estimate for the tag. The server 2 may use Doppler-shift information to determine motion of the tag 3a, 3b, 3c, which it may use to refine a position estimate for the tag.

Further details of one particular set of embodiments will now be provided.

In one set of embodiments, the system 1 comprises battery-powered location transmitters 6a, 6b, 6c that emit ultrasound messages which identify a location, and portable tags 3a, 3b, 3c that detect a location from one of the ultrasound messages and transmit the location over WiFi. The location transmitters 6a, 6b, 6c are administered from the server 2 via the radio-frequency (RF) gateways 4a, 4b. The gateway-to-location-transmitter communication is over a proprietary radio protocol built on an 802.15.4 radio. For convenience, the proprietary radio protocol will be referred to herein as "Snobee". The Snobee protocol is similar to the ZigBee protocol, but has been simplified in order to reduce complexity, power consumption, and code size, such that it can run on smaller microcontrollers with lower cost. Of course, other radio protocols could potentially be used instead.

The system 1 supports several alternatives for receiving and forwarding WiFi messages transmitted by the tags 3a, 3b, 3c to the server 2. The tags 3a, 3b, 3c broadcast location information, button presses, and status information on 802.11 layer 2 multicast. This avoids the power consumption involved in associating with a WiFi network, which is particularly high when the network has enterprise security (authentication and encryption). In some embodiments, the tags 3a, 3b, 3c occasionally do associate with a network in order to check for firmware updates and configuration changes.

The system 1 is designed to achieve reliable location accuracy, down to a resolution of which room the tag 3a, 3b, 3c is in, or which subunit of a room (such as a partitioned hospital bay within a larger ward) the tag 3a, 3b, 3c is in. It aims to do this with a latency of around one second for detecting and reporting location changes, while providing long battery life in both the fixed infrastructure and the tags 3a, 3b, 3c.

Ultrasound is a relatively slow medium compared to radio. The speed of sound and indoor acoustics typically limit the maximum bit rate for ultrasound-encoded data communications to about 50 bits/second. An ultrasound message carrying a 10-bit location ID requires a time slot of approximately 300 milliseconds. In some implementations, at least some of the location transmitters 6a, 6b, 6c may not be in radio communication with a 802.15.4 gateway 4a, 4b and may therefore encode additional status information in the ultrasound messages they transmit (such as the battery level of the location transmitter), which is relayed via the tag 3a, 3b, 3c to the server 2. In practice, a received ultrasound message may require a time slot of nearly 500 milliseconds, including an allowance to receive any significant echoes.

In sub-room-resolution deployments, a tag 3a, 3b, 3c will typically be in ultrasound range of multiple location transmitters 6a, 6b, 6c at any given position. Rather than using a time-slotting mechanism, which can increase the latency of the system and reduce battery life in the tags 3a, 3b, 3c, the location transmitters 6a, 6b, 6c are arranged to emit ultrasound messages simultaneously. The ultrasound protocol and the ultrasound decoders on the tags 3a, 3b, 3c are designed such that the decoders can discriminate between multiple ultrasound location transmitters 6a, 6b, 6c to identify a closest location transmitters 6a, 6b, 6c, based both on time-of-flight and signal-strength information, when the ultrasound messages are transmitted simultaneously.

Simultaneous ultrasound transmission provides low latency and low battery consumption in the tags 6a, 6b, 6c. Further efficiency can be obtained by allocating binary identifiers to the respective location transmitters 6a, 6b, 6c such that nearby location transmitters 6a, 6b, 6c share the major part of the ultrasound message bits in common. The power consumption of each location transmitters 6a, 6b, 6c can thus also be reduced by transmitting the common bits either at lower ultrasound power or only by some of the location transmitters 6a, 6b, 6c.

The highest demands for simultaneous ultrasound transmission are in high-resolution sub-room-level areas where several location transmitters 6a, 6b, 6c are within ultrasound range. The ultrasound protocol and ultrasound receiver may be such that a synchronisation accuracy of approximately one millisecond is required in these areas. That is, any ultrasound transmission can be up to one millisecond off with respect to a reference transmission schedule, and, within an overlap area, a last ultrasound transmission must start no later than two milliseconds after the start of a first ultrasound transmission.

Typical room-resolution deployments are much less sensitive to inaccuracy in the simultaneous ultrasound transmission, e.g. between a location transmitter 6a, 6b, 6c in a room and a location transmitter 6a, 6b, 6c in an adjacent corridor. Any inaccuracy in the time of ultrasound transmission in such a scenario may result in a "grey area" in the door opening between the room and the corridor—but only when the door is open.

The system 2 is designed to operate with a one-second ultrasound message period; i.e., the location transmitters 6a, 6b, 6c each send an ultrasound message once per second.

The tags 3a, 3b, 3c store their current location; that is, the identifier of the location transmitter 6a, 6b, 6c whose ultrasound message they most recently received. When the ultrasound receiver in a tag 3a, 3b, 3c detects and decodes an ultrasound message to determine an identifier, the tag 3a, 3b, 3c reports a new location (identifier) to the server 2 if the location differs from the stored current location.

The tags 3a, 3b, 3c may receive transmission schedule information from the server 2, but in some embodiments they are not directly synchronised by the server 2. Instead, each tag 3a, 3b, 3c has a motion detector which is uses to determine whether the tag is stationary or in motion, and (i) while the tag is in motion, it keeps listening for new ultrasound messages once every second, and (ii) while the tag is stationary, it enters a sleep state, waking every ten minutes to listen for a new ultrasound message. When the tag 3a, 3b, 3c wakes from sleep, it does not know when to expect a next ultrasound message, and so opens an ultrasound receive window with a timeout period of seven seconds. If the decode window expires with no received ultrasound message, the tag 3a, 3b, 3c reports an ultrasound timeout to the server 2.

Movement of the tag 3a, 3b, 3c while it is in a sleep state triggers an immediate wake. When the tag 3a, 3b, 3c is in motion, and listening for ultrasound messages every second, the tag 3a, 3b, 3c uses a low-accuracy internal timer to activate its ultrasound receiver around twenty milliseconds before the next ultrasound message is expected; i.e. 980 milliseconds from the start of the last detected message. To save power, it deactivates the ultrasound receiver between receive windows. This internal timer has an error of about two milliseconds every second. The twenty-millisecond early start accounts for both this internal timer error and any reduction in time-of-flight between successive ultrasound messages due to the distance between the tag 3a, 3b, 3c and the nearest location transmitter 6a, 6b, 6c having reduced. The tag 3a, 3b, 3c listens continuously for up to seven seconds during a receive window for an ultrasound message, before timing out. If no message is found, it enters an "unsynchronised" state where it intermittently checks for ultrasound energy and opens a receive window if ultrasound energy is present. The tag 3a, 3b, 3c re-enters a "synchronised" state if a valid ultrasound message is received during the receive window.

A location is encoded in each ultrasound message as a zone id (ZID) part and an area id (AID) part. Both ZID and AID are five bits long, and together form a ten-bit ultrasound ID from which the server 2 can identify a particular location transmitter 6a, 6b, 6c, whose position is known to the server 2. The ultrasound message starts with the ZID followed by the AID. The ultrasound IDs are allocated among the location transmitters 6a, 6b, 6c such that all ultrasound IDs within ten seconds' walking distance have a different ZID, while the AIDs may be the same. (Ten seconds equals the maximum ultrasound decode window of seven seconds, plus a one-second sample period, plus a two-second margin.) The ultrasound receiver in a tag 3a, 3b, 3c can thus efficiently refresh the current location by decoding only the ZID, and saving power by not decoding the AID unless the ZID differs from the current ZID state stored in the tag 3a, 3b, 3c.

If the location transmitters 6a, 6b, 6c are arranged such that, for a particular area, all transitions of a tag 3a, 3b, 3c into and out of the area will, in normal use, cause a timeout in the ultrasound receiver of the tag 3a, 3b, 3c, this area can be considered to be "ultrasound isolated". Location transmitters 6a, 6b, 6c covering an "ultrasound isolated" area should transmit their ultrasound signals simultaneously with each other, but need not be synchronised with location transmitters in other areas. For example, each floor or each building in an installation may have distinct, respective ultrasound transmission schedules.

The system 1 may also include stand-alone location transmitters (not shown), which have no ultrasound overlap with any other location transmitter 6a, 6b, 6c. Such stand-alone location transmitters need not have any radio link with the server 2. They may not contain any radio transmitter or receiver at all.

Location transmitters 6a, 6b, 6c that do communicate with the server 2 do so using the Snobee radio protocol via the 802.15.4 gateways 4a, 4b. The Snobee protocol builds on an IEEE 802.15.4 radio. The protocol uses 802.15.4 radio frames allowing the system to coexist with other 802.15.4 and ZigBee devices. The system 1 runs on a particular address range in the 802.15.4 address space (on a particular PANID).

The Snobee protocol is closely related to the ZigBee protocol. Battery-operated devices (e.g., location transmitters 6a, 6b. 6c) broadcast "Data Request" messages. These "Data Request" messages include an "Rx on" time delay, after which the device will start listening for a reply to the "Data Request" message. A location transmitter may open a receive window for a predetermined period (e.g. 10 milliseconds) after the "Rx on" time delay. The messages are not requests for any specific information, but are general requests for the server to send any data that it may have for the location transmitter 6a, 6b, 6c. The broadcast is picked up by one or more of the gateways 4a, 4b. The radio receivers in the gateways 4a, 4b are always on, and the gateways 4a, 4b forward any received message, together with a local timestamp, to the server 2. The server 2 selects the gateway 4a, 4b with the strongest received signal strength indicator (RSSI) for the broadcast to reply to the "Data Request" message.

When the server 2 has any queued requests for a location transmitter 6a, 6b, 6c, it uses the first request in the queue as reply to a "Data Request" message; otherwise it sends an "Acknowledge" message, which has the effect of terminating the radio listen window in the location transmitter 6a, 6b, 6c, thereby saving power.

The server 2 sends a command to the selected gateway 4a, 4b to transmit the reply to the 802.15.4 address of the location transmitter 6a, 6b, 6c at a particular time as measured by a local clock on the particular gateway. This time is the local reception timestamp for the "Data Request" broadcast by the gateway, plus the "Rx on" time delay contained in the "Data Request" message. The "Rx on" time delay is typically 100 milliseconds. This time delay covers IP transfer time from the gateway 4a, 4b to the server 2, an accumulation interval in the server 2 for observing all broadcast receptions, the IP transfer time for getting a "send data" command back to the gateway 4a, 4b, and some spare buffer time.

The battery-operated location transmitters 6a, 6b, 6c typically broadcast a "Data Request" every 60 seconds, polling the server 2 for any queued requests. After an initial configuration phase, there will typically not be any requests in the queue, except some regular and relatively-rare polling for status information by the server 2. The server 2 can flag in the message to a location transmitter 6a, 6b, 6c that the server 2 has more requests queued for that particular location transmitter. The location transmitter can then decide when it prefers to poll this queue, but generally the next "Data Request" follows within two seconds. The interval for these follow-up "Data Requests" depends on the battery technology, charge capacitors, etc. in the location transmitter 6a, 6b, 6c. (The radio transmission can temporarily deplete the power reservoirs in the device, needing some time for recharge.)

The location transmitters 6a, 6b, 6c and gateways 4a, 4b all contain the same radio module design. This radio module includes a timer running off a 32 kHz crystal oscillator to provide a stable time reference. This timer is referred to herein as the clock of the device. A typical crystal has an accuracy of approximately ten parts-per-million. So, in 100,000 seconds (just over 24 hours), the error will be around one second. This exactly meets the requirement stated above for an accuracy of 1 millisecond in 100 seconds for the ultrasound synchronisation. The timer has 24-bit resolution and wraps around about every 10 minutes. The system 1 adjusts the ultrasound transmission schedules of the location transmitters 6a, 6b, 6c to compensate for device clock drift and clock offset (device resets) as follows.

The Snobee "Data Request" broadcast by a location transmitter 6a, 6b, 6c includes a location-transmitter local timestamp from the device clock. The broadcast may be received by one or more gateways 4a, 4b, each gateway 4a, 4b assigning a gateway local timestamp from its gateway clock. There is very little jitter in this process. The only jitter in the location transmitters 6a, 6b, 6c arises from any interrupts between assigning a local timestamp, calling the broadcast procedure, and physically starting the RF transmission. Likewise the only jitter in the gateways 4a, 4b arises from any delays between physically receiving the message at the gateway 4a, 4b, and assigning the local timestamp. For practical purposes it can be assumed that the gateway local timestamps and the location-transmitter local timestamp in a broadcast represent the same time instant, as any jitter will, in general, be much less than a single clock tick.

Figure 2:
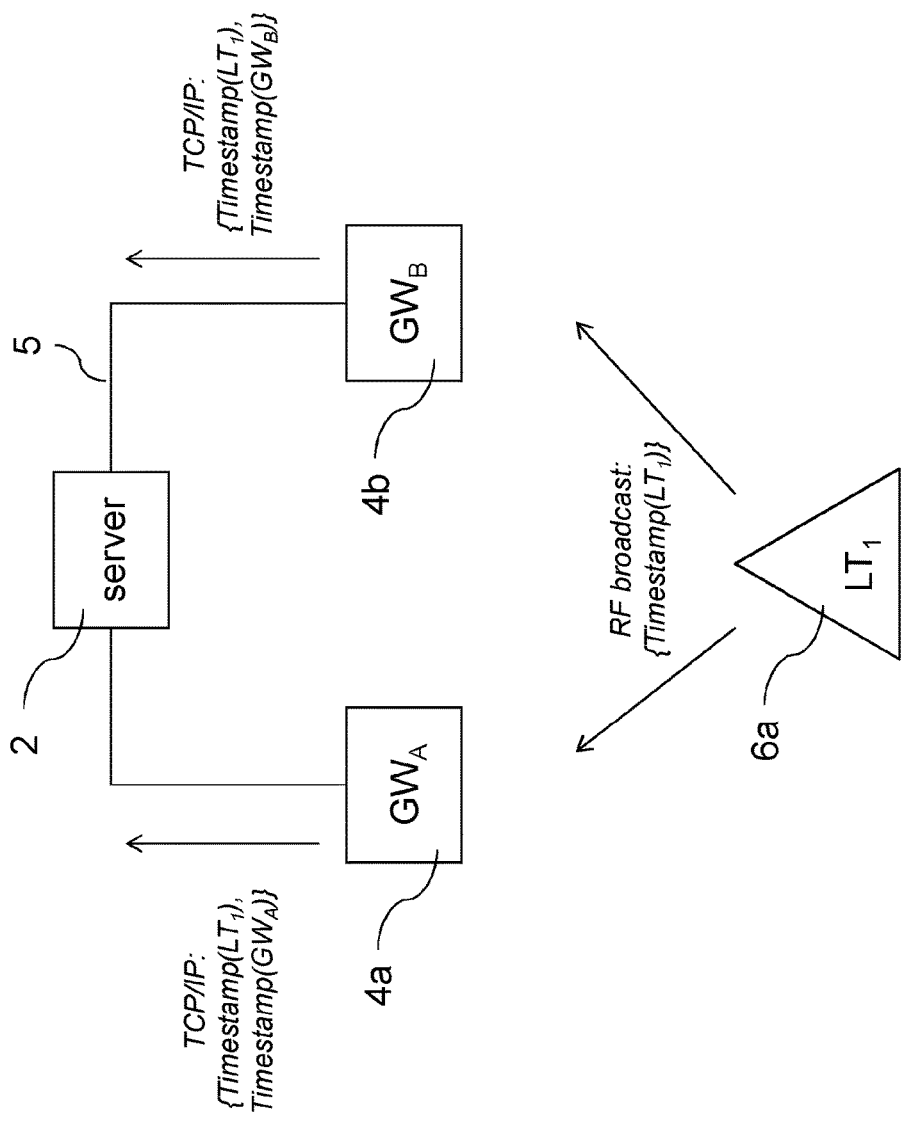
FIG. 2 is a schematic drawing showing example messages that are transmitted between components of the system.

FIG. 2 shows an exemplary data flow for a "Data Request" broadcast by a location transmitter 6a, $LT_1$, and received by two Snobee gateways 4a, 4b, $GW_A$ and $GW_B$. After receiving the broadcast, which includes a transmission timestamp according to the location transmitter $LT_1$'s local clock, each gateways 4a, 4b sends a message to the server 2 by TCP/IP over the Ethernet network 5 containing the received LT1 timestamp and a gateway transmission timestamp for the TCP/IP message according to the gateway's local clock.

This data provides the server 2 with observations and data points for determining the following location-transmitter and gateway clock-pair offsets:

Clock($LT_1$) vs Clock($GW_A$);
Clock($LT_1$) vs Clock($GW_B$); and
Clock($GW_A$) vs Clock($GW_B$)

The observation of the same "Data Request" broadcast by multiple gateways 4a, 4b provides the server 2 with data for determining the clock offset between those gateways 4a, 4b, irrespective of the content of the broadcast message.

By determining a plurality of offsets, for each clock pair, over time, from multiple "Data Request" broadcasts, the server 2 can track the relative drift between the two clocks of each pair. This is done by performing a linear fit operation over a series of clock observations. This linear fit provides the clock drift (scale) and the clock offset (difference) between the two clocks. The server 2 may track every possible pairing of the location transmitters 6a, 6b, 6c and the gateways 4a, 4b (collectively referred to as "devices" in the following description) in the system 1, for which appropriate timestamp data is available. Alternatively, to reduce processing load, the server 2 may track only a subset of the location-transmitter-gateway pairs, e.g., based on which pairs have the strongest radio link between them (RSSI).

The clock observations are first filtered to ensure a monotonically increasing clock. By extrapolating from the last observation using the normative clock frequency, a device clock (timer) wrap-around can be detected and corrected for.

Each clock observation pair is appended to a linear-fit buffer of a configurable size (typically 30 data points). The linear-fitting process can be CPU resource intensive, and must be done for many device pairs. Therefore, only observations beyond a configurable grace period (typically 10 seconds) after the last-added observation are added to the buffer. This avoids buffering a cluster of closely-spaced data points arising from a sequence of rapid "Data Requests" which may occur when a request queue on the server 2 is transferred to a location transmitter 6a, 6b, 6c. Such a cluster does not provide much support beyond a single point for the linear fit quality.

To reduce CPU usage further, and to track fluctuations of clock drift over time (e.g. due to voltage and temperature variations), the linear fit buffer is constrained to a configurable time interval (typically 10 minutes). Observations further back in time are masked out at the start of each linear fit process.

The linear fit may be subject to an outlier-removal process.

The linear fit fails if (i) there is no solution in a configurable number of iterations (typically ten iterations); or (ii) the number of remaining unmasked points in the buffer is below a configurable number (typically five); or (iii) the average residual per unmasked data point exceeds a configurable threshold (typically ten).

Every pair of gateways 4a, 4b and location transmitters 6a, 6b, 6c has two states: "unlocked" and "locked".

The pair is unlocked when there are an insufficient number of data points for a linear fit operation, or when the quality of the linear fit is poor. The server 2 is notified when a location transmitter 6a, 6b, 6c or gateway 4a, 4b resets, and immediately unlocks all pairs involving the location transmitter or gateway and clears all associated linear-fit buffers.

When a pair is locked it is possible to accurately map time values from one device clock to the other, and vice versa. The "lock(A, B)" binary relation between two devices A and B has the following properties:

it is symmetric: lock(A, B)=lock(B, A);
it is transitive: if lock(A, B) and lock(B, C) then lock(A, C); and
it is reflexive: lock(A, A) is true.

Thus, the "lock(A,B)" relation is an equivalence relation.

The server 2 maintains the observed device pairs in a structure where the unique device names of the gateways 4a, 4b and location transmitters 6a, 6b, 6c are lexically sorted such that the pair is uniquely represented, i.e. the pair (D1, D2) and the pair (D2, D1) map to the same clock tracker for any two devices D1 and D2.

The location transmitters 6a, 6b, 6c and gateways 4a, 4b are preferably spatially distributed throughout a building. The density of gateways 4a, 4b is preferably such that gateway ranges overlap. Location transmitters that are located in range of multiple gateways allow the server 2 to lock those gateways. It will therefore usually be possible for the server 2 to lock the set of all gateways 4a, 4b situated within a particular area, such as a floor of the building.

The location transmitters 6a, 6b, 6c in the system 1 are synchronised so that they simultaneously all send one ultrasound message per second. This is achieved by each location transmitter 6a, 6b, 6c storing an ultrasound schedule that is tied to the respective clock of the location transmitter.

The location transmitters 6a, 6b, 6c append their current ultrasound schedule to every "Data Request" they send, along with a timestamp, from their local clock, of their latest ultrasound transmission. This relieves the server 2 from the burden of having to track the state of each location transmitter 6a, 6b, 6c. The server 2 can, instead, simply use the timestamp from the location transmitter 6a, 6b, 6c as a starting point for calculating an updated transmission schedule for the location transmitter.

When the server 2 receives one or more observations of a "Data Request" message from a location transmitter 6a, 6b, 6c, it updates the clock-tracking of all affected location-transmitter-gateway and gateway-gateway pairs.

After the server 2 is started (e.g., after a reboot), gateway-gateway locks develop after some time, and the server 2 selects one of these gateways 4a, 4b to be a reference gateway whose clock provides a reference clock for the system 1. The pairwise offset and drift information can be used to calculate drift and offset information for each individual device clock, relative to the reference gateway, and it thus effectively allows the server 2 to model each individual device clock. Location transmitters 6a, 6b, 6c do not transmit positioning signals until they are locked, but they do send radio broadcasts so that the server can attain lock. If the server 2 determines, from the information included in the "Data Request" messages, that the ultrasound schedules across some location transmitters 6a, 6b, 6c are consistent (are approximately simultaneous), the server 2 picks a clock offset on the selected reference gateway 4a, 4b that does not move the ultrasound schedule. The server 2 does, however, change the period of the ultrasound schedule to be 32,000 clock ticks as measured according to the clock of the reference gateway. If the observed location transmitters 6a, 6b, 6c have inconsistent ultrasound schedules, the server 2 will pick an arbitrary clock offset on the reference gateway.

After updating the clock tracking, the server 2 proceeds to calculate and send ultrasound schedules to the location transmitters 6a, 6b, 6c. Updated schedules may be sent at regular intervals (e.g., every five minutes); however, in order to save resources, updated schedules are preferably sent to a location transmitter 6a, 6b, 6c only when the clock of the location transmitter is determined, by the server 2, from a "Data Request" timestamp, to have deviated from its model on the server 2 by more than a configurable threshold amount (e.g., 100 microseconds), or if a configurable, maximum amount of time has passed since the last update. The location transmitters 6a, 6b, 6c can typically run for hours without the ultrasound schedule drifting seriously.

The ultrasound schedule is set according to the reference gateway. The reference gateway clock determines the period of the ultrasound schedule for all location transmitters 6a, 6b, 6c. The ultrasound schedule requires an ultrasound message to be transmitted every 32,000 ticks of the reference gateway clock, at an offset determined by the server 2.

For deployments where there is discontinuous Snobee or ultrasound coverage, e.g. between buildings or between floors, the system 1 supports multiple ultrasound schedule clusters. Gateways 4a, 4b and location transmitters 6a, 6b, 6c can be tagged with a "cluster ID". One reference gateway is selected per cluster, with each cluster operating an independent ultrasound schedule. Each location transmitter 6a, 6b, 6c will be updated with the ultrasound schedule of the cluster it belongs to. The server 2 may, for example, create a different cluster for each floor level, where there is discontinuous ultrasound, in order to reduce the load on the server 2, and to improve synchronisation accuracy by avoiding long synchronisation paths.

If the reference gateway goes down, the server 2 will pick another reference gateway from the gateways 4a, 4b, attempting to preserve the same offset, but changing to use the period of the new reference gateway clock in future ultrasound schedules. This new period may be slightly different from the period of the old reference clock. The server 2 can be configured to limit the reference gateway candidates to be in the middle of a building in order to minimize the path lengths from a reference gateway to the location transmitters 6a, 6b, 6c.

After a change in the reference gateway, new ultrasound schedules are pushed to the location transmitters 6a, 6b, 6c over a period of time. There is therefore a risk, during this period, of the location transmitters 6a, 6b, 6c having inconsistent ultrasound schedules, with some using the period of the new reference gateway, while others are still on the period of the old reference gateway.

Each updated ultrasound schedule contains a new offset and period, with respect to the local location-transmitter 6a, 6b, 6c device clock. The offset is the time of the next ultrasound message, specified as the absolute location-transmitter clock counter value at which the location transmitter is to transmit the next ultrasound message. The server 2 determines this offset by adding the period to the time, reported by the location transmitter 6a, 6b, 6c, that the location transmitter transmitted its most-recent previous ultrasound message. The offset and the period have a fractional representation, in order to improve on the 32 kHz clock tick resolution.

After sending an ultrasound message at the instructed offset, a location transmitter 6a, 6b, 6c then adds the period to the offset and waits for a device clock alarm on the integer part, keeping the fractional part to be accumulated for the next ultrasound message. This repeats until a new ultrasound schedule is received, or until a timeout elapses. This scheme allows the location transmitters 6a, 6b, 6c to run autonomously on the instructed schedule for several hours while the ultrasound from the location transmitters 6a, 6b, 6c remains coordinated within the required one-millisecond error. The location transmitters 6a, 6b, 6c are configured with an ultrasound schedule timeout—if a location transmitter does not receive an ultrasound schedule update within the timeout, it can be configured either to keep sending ultrasound at its internal device clock 32 kHz period, or to stop sending ultrasound.

In order to generate an updated ultrasound schedule for a location transmitter 6a, 6b, 6c, the server 2 first finds an optimal way of transforming the current reference clock to the location-transmitter clock. To do this, the server 2 constructs a device graph, starting at the reference gateway and adding all other gateways 4a, 4b and location transmitters 6a, 6b, 6c that are reachable under the "lock" relation, based on the current clock-tracking state. This device graph may include gateway-gateway edges. The graph does not refer to a physical path for passing messages. Rather, it is purely used for calculating the updated ultrasound schedule, and for estimating the error in the current ultrasound schedule (as explained below). The server 2 uses the device graph to generate appropriate ultrasound schedules for specific location-transmitter clocks.

The device graph can in principle be weighted, e.g. by a Snobee received signal strength indicator (RSSI). However, more straightforwardly, an edge between a gateway 4a, 4b and a location transmitter 6a, 6b, 6c is included in the device graph only if the RSSI between the two devices exceeds a configurable threshold (which may be zero). The shortest path from the reference gateway to a location transmitter 6a, 6b, 6c is found using a breadth-first search of the device graph. The updated ultrasound schedule may thus be calculated using any number of gateway-gateway locks, followed by a gateway-location-transmitter lock for the final hop.

Based on the optimal path of device locks from the reference gateway to a location transmitter 6a, 6b, 6c, the linear transformation of each device pair is composed along the path to form a linear mapping from the reference gateway clock to the location-transmitter clock. This linear mapping is then used to find a new ultrasound-schedule offset that maps the next ultrasound message, according to the reference gateway clock, to the location-transmitter clock. The scale factor in the composed linear mapping provides the new ultrasound schedule period in terms of the location-transmitter clock with respect to the reference gateway clock. The period under the reference clock is 32,000 ticks, which is mapped to a number of ticks of the particular location-transmitter clock.

A new ultrasound schedule is sent to a location transmitter 6a, 6b, 6c as a normal response to a "Data Request". The response is sent from the server 2, via Ethernet 5, to an appropriate gateway 4a, 4b, such as the gateway that was first to forward the "Data Request" to the server 2, or the gateway that observed the "Data Request" with the highest signal strength (RSSI) with that location transmitter. This gateway relays the new ultrasound schedule to the location transmitter. The relaying gateway does not, itself, necessarily have to be locked to the reference gateway or to the location transmitter. Although the system 1 could potentially be configured to allow a response to be routed over one or more gateway-gateway hops on its way to a location transmitter (i.e., a mesh Snobee topology), in the present embodiment each message passes through only a single gateway 4a, 4b (i.e., a star Snobee topology).

An ultrasound schedule error for a location transmitter 6a, 6b, 6c is estimated, by the server 2, at each schedule update by inversely mapping the reported time of the latest ultrasound message, included in the "Data Request", to the reference gateway clock, and subtracting this from the time at which the ultrasound message should have been transmitted, according to the reference gateway clock. An administrator can be alerted when the estimated ultrasound schedule error of any location transmitter 6a, 6b, 6c exceeds a configurable threshold.

This system 1 can achieve microsecond-level synchronisation while requiring very low schedule update rates.

In some alternative embodiments, instead of one of the gateways 4a, 4b providing a reference clock for the system 1, a clock on the server 2 could be used as a reference clock. While this is possible, it has been found to be less accurate, because the round-trip IP delay over the Ethernet network 5 from the server 2 to a gateway 4a, 4b and back to the server 2 may typically be 15 to 20 milliseconds, and very variable, with a standard deviation of 5 milliseconds or more. A location-transmitter clock could still be tracked over time quite accurately with a linear fit, but at any given time there may be substantial instantaneous errors and much more smoothing is therefore required in such embodiments.

It will be appreciated by those skilled in the art that the invention has been illustrated by describing one or more specific embodiments, but is not limited to these embodiments; many variations and modifications are possible, within the scope of the accompanying claims.

What is claimed is:

1. A system for determining a location of a mobile receiver unit, the system comprising:
    a plurality of static transmitter units, each comprising a respective radio transmitter and a respective clock, and being configured to use the respective clock to transmit a respective positioning signal according to a respective transmission schedule;
    one or more radio gateways for communicating with the static transmitter units by radio, each radio gateway comprising a respective clock;
    a scheduling server, communicatively coupled to the plurality of static transmitter units and to the one or more radio gateways;
    a mobile receiver unit configured to receive a positioning signal from any of the static transmitter units; and
    a location-determining server, wherein the scheduling server is configured to:
        use information representing a respective drift or offset of each of the respective clocks of the static transmitter units to generate the respective transmission schedules for the respective static transmitter units, each transmission schedule instructing a respective static transmitter unit to transmit the respective positioning signal at one or more scheduled times according to the clock of the static transmitter unit, by (i) determining information representing a device graph, the device graph comprising the one or more radio gateways and the static transmitter units, wherein a pair of devices is connected in the device graph when the scheduling server has received information representing the drift or offset of respective clocks of the pair of devices, satisfying one or more quality criteria, that enables the scheduling server to map time between the respective clocks of the pair of devices, and (ii) for each static transmitter unit, determining a respective shortest path through the device graph between a reference radio gateway of the one or more radio gateways and the static transmitter unit, and composing relative offset or drift information for devices along the respective shortest path in order to map a respective time or time period from the clock of the reference radio gateway to the clock of the respective static transmitter unit; and
        send the respective transmission schedules to the respective static transmitters units;
    wherein the mobile receiver unit is configured to send information derived from a positioning signal, received from any of the static transmitter units, to the location-determining server, and
    wherein the location-determining server is configured to use the information sent by the mobile receiver unit to determine the location of the mobile receiver unit.

2. The system of claim 1, wherein the generated transmission schedules instruct the static transmitter units to transmit positioning signals in different respective time slots.

3. The system of claim 1, wherein the generated transmission schedules instruct the respective static transmitter units to transmit the respective positioning signals simultaneously.

4. The system of claim 1, wherein the mobile receiver unit is configured to send the information derived from the received positioning signal to the location-determining server over one or more wireless links.

5. The system of claim 1, wherein the scheduling server is configured to send the respective transmission schedules to the respective static transmitter units over one or more wireless links.

6. The system of claim 1, wherein the scheduling server is configured to use information representative of both the drift and the offset of each of the clocks of the static transmitter units to generate the respective transmission schedules for the respective static transmitter units.

7. The system of claim 1, wherein the static transmitter units are configured to transmit discrete positioning signals at intervals.

8. The system of claim 1, wherein the positioning signals are ultrasonic signals.

9. The system of claim 1, wherein at least some of the positioning signals encode respective identifiers associated with the respective static transmitter units that transmit the respective positioning signals.

10. The system of claim 1, wherein each transmission schedule comprises one or more values that determine a set of one or more clock values at which the respective static transmitter unit should transmit the respective positioning signal according to the respective clock of the respective static transmitter unit.

11. The system of claim 1, wherein each transmission schedule communicates a clock value and a period to the respective static transmitter unit, and wherein each static transmitter unit is configured to transmit a positioning signal when the respective clock of the respective static transmitter unit equals the respective communicated clock value and to transmit further positioning signals at intervals defined by the period.

12. The system of claim 1, wherein the location-determining server is configured to determine the location of the mobile receiver unit from any one or more of the group consisting of: information identifying a static transmitter unit that transmitted the received positioning signal; information representative of a timing of the received positioning signal; information representative of a received signal strength of the received positioning signal; information representative of a frequency of the received positioning signal; information representative of a frequency shift of the received positioning signal; and information representative of an angle-of-arrival of the received positioning signal.

13. The system of claim 1, wherein the scheduling server is configured to send an updated transmission schedule to a static transmitter unit, of the plurality of static transmitter units, when the respective clock on the respective static transmitter unit is determined by the scheduling server to have deviated from an expected time by more than a threshold level.

14. The system of claim 1, wherein the information representative of a respective drift or offset of each of the clocks of the static transmitter units is stored as data representing relative offsets or drifts between pairs of devices in the system, wherein the devices comprise clocks and include the plurality of static transmitter units.

15. The system of claim 1, wherein each static transmitter unit is configured to broadcast transmitter-unit messages, by radio, at intervals, and wherein each radio gateway is configured to forward transmitter-unit messages that the radio gateway receives from the static transmitter units to the scheduling server.

16. The system of claim 15, wherein each transmitter-unit message includes information representing a time, according to the respective clock of the respective static transmitter unit, at which the respective static transmitter unit transmitted a most-recent positioning signal, and wherein the scheduling server is configured to use said information when generating an updated transmission schedule for the respective static transmitter unit.

17. The system of claim 15, wherein each radio gateway is configured, when forwarding a respective transmitter-unit message, received from a respective static transmitter unit of the plurality of static transmitter units, to the scheduling server, to send a reception timestamp to the scheduling server representing a time that the radio gateway received the respective transmitter-unit message from the respective static transmitter unit, according to the respective clock of the respective radio gateway.

18. The system of claim 17, wherein each static transmitter unit is configured to send a transmission timestamp to the scheduling server representing a time that the respective static transmitter unit transmitted the transmitter-unit message, according to the respective clock of the respective static transmitter unit, and wherein the scheduling server is configured to use transmission timestamps for the transmitter-unit messages, and respective reception timestamps from one or more radio gateways, to determine information representative of drift or offset for the respective clocks of the respective static transmitter units.

19. The system of claim 18, wherein the scheduling server is configured, for a pairing of a radio gateway and a static transmitter unit, to store, in a buffer, information representative of a plurality of transmission timestamps from the static transmitter unit and corresponding reception timestamps from the radio gateway, and to use the buffered information to estimate a relative drift between the clock of the radio gateway and the clock of the static transmitter unit.

20. The system of claim 17, wherein the scheduling server is configured to use reception timestamps from two or more radio gateways, relating to a single transmitter-unit message from a static transmitter unit that is received by all of the two or more radio gateways, to determine a relative offset or drift between the clocks of the two or more radio gateways.

21. The system of claim 20, wherein the scheduling server is configured, for a pairing of two radio gateways, to store, in a buffer, information representative of a plurality of corresponding reception timestamps from the radio gateways, and to use the buffered information to estimate a relative drift between the clocks of the radio gateways.

22. The system of claim 1, wherein the scheduling server is configured to select one of the radio gateways to be the reference radio gateway for the system.

23. The system of claim 1, wherein the scheduling server is also the location-determining server.

24. The system of claim 1, wherein the scheduling server is configured to determine, for each pairing of a plurality of pairings formed of two radio gateways or of one radio gateway and one static transmitter unit, when the scheduling server has received information representing the drift or offset of respective clocks of the pair of devices, satisfying said one or more quality criteria, that enables the scheduling server to map time between the respective clocks of the pair of devices.

25. A method of determining a location of a mobile receiver unit using a plurality of static transmitter units, each comprising a respective clock, using one or more radio gateways for communicating with the static transmitter units by radio, each radio gateway comprising a respective clock, the method comprising:

a scheduling server using information representative of a respective drift or offset of each of the respective clocks of the static transmitter units to generate the respective transmission schedules for the respective static transmitter units, each transmission schedule instructing a respective static transmitter unit to transmit the respective positioning signal at one or more scheduled times according to the clock of the respective static transmitter unit, by (i) determining information representing a device graph, the device graph comprising the one or more radio gateways and the static transmitter units, wherein a pair of devices is connected in the device graph when the scheduling server has received information representing the drift or offset of respective clocks of the pair of devices, satisfying one or more quality criteria, that enables the scheduling server to map time between the respective clocks of the pair of devices, and (ii) for each static transmitter unit, determining a respective shortest path through the device graph between a reference radio gateway of the one or more radio gateways and the static transmitter unit, and composing relative offset or drift information for devices along the respective shortest path in order to map a respective time or time period from the clock of the reference radio gateway to the clock of the respective static transmitter unit;

sending the respective transmission schedules to the respective static transmitters units;

each of the static transmitters units using its clock to transmit a respective positioning signal according to the respective transmission schedule for the static transmitter unit;

receiving one of the positioning signals at the mobile receiver unit; and using information derived from the received positioning signal to determine the location of the mobile receiver unit.

26. A scheduling server for use in a system for determining a location of a mobile receiver unit, the system comprising one or more radio gateways, each comprising a respective clock, and a plurality of static transmitter units, each comprising a respective clock and being configured to use the respective clock to transmit a positioning signal according to a respective transmission schedule, wherein the scheduling server is configured to:

use information representative of a respective drift or offset of each of the respective clocks of the static transmitter units to generate the respective transmission schedules for the respective static transmitter units, each transmission schedule instructing a respective static transmitter unit to transmit the respective positioning signal at one or more scheduled times according to the respective clock of the static transmitter unit, by (i) determining information representing a device graph, the device graph comprising the one or more radio gateways and the static transmitter units, wherein a pair of devices is connected in the device graph when the scheduling server has received information representing the drift or offset of respective clocks of the pair of devices, satisfying one or more quality criteria, that enables the scheduling server to map time between the respective clocks of the pair of devices, and (ii) for each static transmitter unit, determining a respective shortest path through the device graph between a reference radio gateway of the one or more radio gateways and the static transmitter unit, and composing relative offset or drift information for devices along the respective shortest path in order to map a respective time or time period from the clock of the reference radio gateway to the clock of the respective static transmitter unit;

send the respective transmission schedules to the respective static transmitters units; and receive information, from the mobile receiver unit, derived from a positioning signal received by the mobile receiver unit from one of the static transmitter units, and to use the information to determine the location of the mobile receiver unit.

27. A system for determining a location of a mobile receiver unit, the system comprising:

a plurality of static transmitter units, each comprising a respective radio transmitter and a respective clock, and being configured to use the respective clock to transmit a respective positioning signal according to a respective transmission schedule;

one or more radio gateways for communicating with the static transmitter units by radio, each radio gateway comprising a respective clock;

a scheduling server, communicatively coupled to the plurality of static transmitter units and to the one or more radio gateways; and a mobile receiver unit configured to receive a positioning signal from any of the static transmitter units, wherein the scheduling server is configured to:

use information representing a respective drift or offset of each of the respective clocks of the static transmitter units to generate the respective transmission schedules for the respective static transmitter units, each transmission schedule instructing a respective static transmitter unit to transmit the respective positioning signal at one or more scheduled times according to the respective clock of the static transmitter unit, by (i) determining information representing a device graph, the device graph comprising the one or more radio gateways and the static transmitter units, wherein a pair of devices is connected in the device graph when the scheduling server has received information representing the drift or offset of respective clocks of the pair of devices, satisfying one or more quality criteria, that enables the scheduling server to map time between the respective clocks of the pair of devices, and (ii) for each static transmitter unit, determining a respective shortest path through the device graph between a reference radio gateway of the one or more radio gateways and the static transmitter unit, and composing relative offset or drift information for devices along the respective shortest path in order to map a respective time or time period from the clock of the reference radio gateway to the clock of the respective static transmitter unit; and send the respective transmission schedules to the respective static transmitters units, wherein the mobile receiver unit is configured to derive information from a positioning signal, received from any of the static transmitter units, and to use the information to determine the location of the mobile receiver unit.

* * * * *